US008684641B2

(12) United States Patent
Moffatt

(10) Patent No.: US 8,684,641 B2
(45) Date of Patent: Apr. 1, 2014

(54) LOCKING HOLE SAW COLLAR

(75) Inventor: Wilbur Keith Moffatt, Freeport, IL (US)

(73) Assignee: Greenlee Textron Inc., Rockford, IL (US)

( * ) Notice: Subject to any disclaimer, the term of this patent is extended or adjusted under 35 U.S.C. 154(b) by 534 days.

(21) Appl. No.: 13/006,633

(22) Filed: Jan. 14, 2011

(65) Prior Publication Data

US 2011/0170968 A1 Jul. 14, 2011

Related U.S. Application Data

(60) Provisional application No. 61/294,880, filed on Jan. 14, 2010.

(51) Int. Cl.
*B23B 51/05* (2006.01)

(52) U.S. Cl.
USPC ........................ 408/204; 408/239 R; 408/1 R

(58) Field of Classification Search
USPC ...... 408/204, 206, 238, 239 R, 1 R; 411/274, 411/275, 230, 936
See application file for complete search history.

(56) References Cited

U.S. PATENT DOCUMENTS

| | | | | |
|---|---|---|---|---|
| 323,560 | A * | 8/1885 | Burdick | 411/230 |
| 724,196 | A * | 3/1903 | Marshall | 411/274 |
| 1,111,382 | A * | 9/1914 | Hibbard | 411/167 |
| 3,390,596 | A | 7/1968 | Trevathan | |
| 5,658,102 | A * | 8/1997 | Gale | 408/1 R |
| 5,868,532 | A * | 2/1999 | Spenser | 408/204 |
| 5,967,709 | A * | 10/1999 | Thuesen | 408/204 |
| 6,120,221 | A * | 9/2000 | Alm | 408/204 |
| 2001/0001276 | A1* | 5/2001 | Chao | 408/204 |
| 2002/0122703 | A1 | 9/2002 | Czyzewski et al. | |
| 2005/0025591 | A1* | 2/2005 | Korb et al. | 408/204 |
| 2005/0105981 | A1 | 5/2005 | Byrley et al. | |
| 2006/0280569 | A1* | 12/2006 | Davis | 408/204 |
| 2007/0269280 | A1 | 11/2007 | Vasudeva et al. | |

FOREIGN PATENT DOCUMENTS

WO WO 2004011179 A1 * 2/2004

OTHER PUBLICATIONS

Search Report completed on Feb. 28, 2011 which issued in connection with corresponding PCT/US2011/021265; Eleven (11) pages.
International Preliminary Report on Patentability (6 pages), mailed Jul. 26, 2012.

* cited by examiner

*Primary Examiner* — Daniel Howell
(74) *Attorney, Agent, or Firm* — Klintworth and Rozenblat IP LLC

(57) ABSTRACT

An assembly includes a hole saw, an arbor, a collar and a nut. The hole saw is formed from a back plate and a skirt which has a cutting edge on its free end. A passageway is provided through the hole saw. The arbor is rotatably mounted to the hole saw and extends through the passageway. The collar is nonrotatably mounted on the arbor. The collar has a protrusion extending from an end face thereof. A nut is rotatably mounted on the arbor. The collar is trapped between the nut and the hole saw. The nut directly bears against the end face and the protrusion of the collar, which causes the nut to cock relative to the collar. As a result, the nut does not easily come loose on the arbor, even during aggressive use.

9 Claims, 3 Drawing Sheets

28
22
24
68
76
26
74
58
30
32
42
20
34

LOCKING HOLE SAW COLLAR

FIELD OF THE INVENTION

The present invention relates to a collar for a hole saw which includes a protrusion that causes sufficient friction to hold a nut in place on the collar even during aggressive use.

BACKGROUND OF THE INVENTION

Hole saws are commonly used in connection with electric drills to create holes in a workpiece, such as sheet metal. Prior art hole saws are mounted on an arbor which is secured to the hole saw by a collar and standard nut. A pilot bit is mounted to the arbor. The arbor is driven by the drill.

The collar has a locking pins or other protrusions extending therefrom which engage with apertures in the hole saw to prevent relative rotation between the collar and the hole saw. The nut is threaded onto the arbor and directly bears against the collar to prevent the disengagement of the collar from the hole saw.

During use, the nut may unthread from the arbor which can cause the locking pins to disengage from the hole saw, even when the nut is tightened with a wrench. If the locking pins disengage completely, the arbor will rotate relative to the hole saw, and thus, the hole saw will not rotate to cut the workpiece. This is an undesirable result which causes the user to have to stop work and retighten the nut on the arbor.

The present invention provides a novel hole saw which overcomes the disadvantages presented by the prior art. Other features and advantages will become apparent upon a reading of the attached specification, in combination with a study of the drawings.

SUMMARY OF THE INVENTION

An assembly includes a hole saw, an arbor, a collar and a nut. The hole saw is formed from a back plate and a skirt which has a cutting edge on its free end. A passageway is provided through the hole saw. The arbor is rotatably mounted to the hole saw and extends through the passageway. The collar is nonrotatably mounted on the arbor. The collar has a protrusion extending from an end face thereof. A nut is rotatably mounted on the arbor. The collar is trapped between the nut and the hole saw. The nut directly bears against the end face and the protrusion of the collar, which causes the nut to cock relative to the collar. As a result, the nut does not easily come loose on the arbor, even during aggressive use.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE ILLUSTRATED EMBODIMENTS

Figure 1:
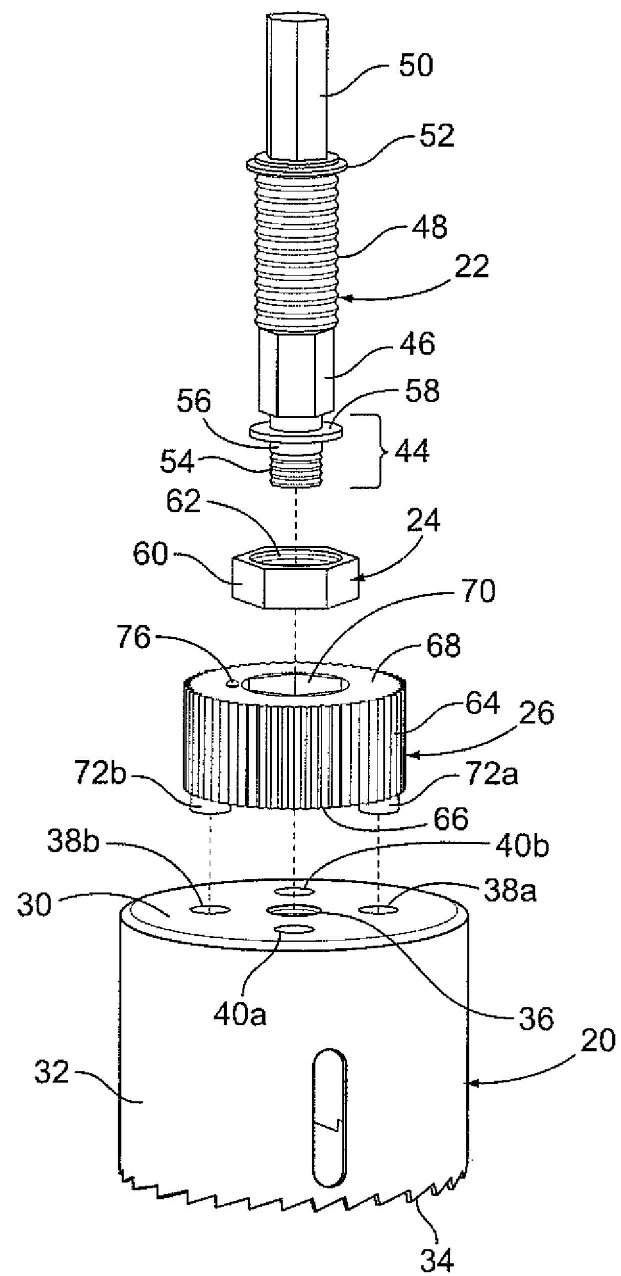
FIG. 1 is an exploded perspective view of an assembly which incorporates the features of the invention.
Figure 2:
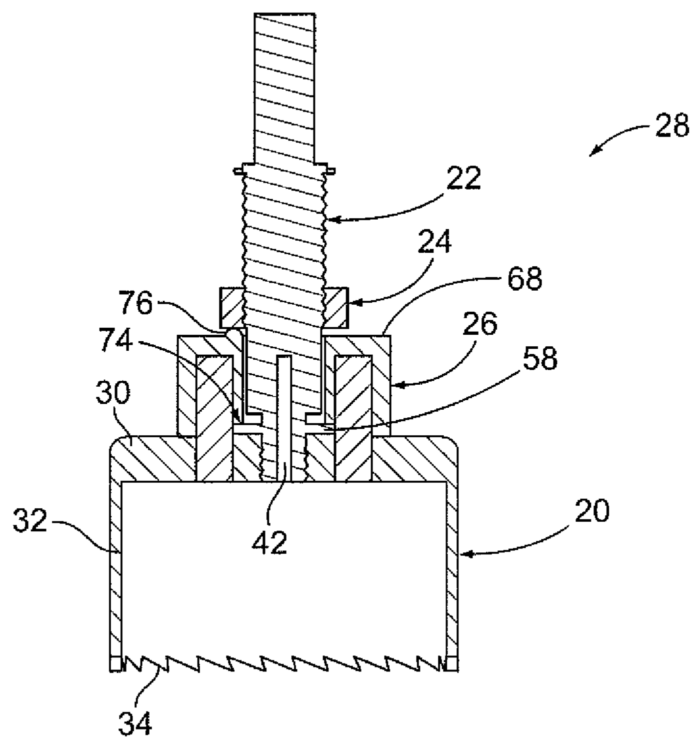
FIG. 2 is a cross-sectional view of the assembly.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein. Therefore, unless otherwise noted, features disclosed herein may be combined together to form additional combinations that were not otherwise shown for purposes of brevity.

The present invention provides a hole saw 20, an arbor 22, a nut 24 and a collar 26 which are assembled to together with a pilot bit (not shown) to form an assembly 28 for cutting a hole in a workpiece (not shown), such as sheet metal. All of the components are formed of metal. The pilot bit is mounted to the arbor 22, and the arbor 22 is attached to the hole saw 20 by the collar 26 and the nut 24.

The hole saw 20 includes a circularly-shaped back plate 30 and a cylindrically shaped skirt 32 which depends from the back plate 30. A cutting edge 34 formed of a plurality of teeth are provided at the free end of the skirt 32. A passageway 36 is provided through the axial center of the back plate 30 through which the arbor 22 is attached. The passageway 36 includes an internal thread form. First and second pairs of diametrically opposed apertures 38*a*, 38*b*, 40*a*, 40*b* extend through the back plate 30. The first pair of apertures 38*a*, 38*b* is offset by ninety degrees from the second pair of apertures 40*a*, 40*b*.

The arbor 22 includes a passageway 42 in one end into which the pilot bit is seated. The arbor 22 includes a first section 44, a second unthreaded section 46 having an end connected to the first section 44, a third threaded section 48 connected to the opposite end of the second section 46, and a fourth unthreaded section 50 having an end connected to the opposite end of the third section 48. The fourth section 50 has a groove (not shown) into which a C-clip 52 is seated. The first section 44 rotatably attaches the arbor 22 to the hole saw 20 as described herein. The nut 24 and collar 26 attach to the second and third sections 46, 48 to cause the arbor 22 to be nonrotatably attached to the hole saw 20 as described herein.

The second and third sections 46, 48 have outer diameters which are the same. The C-clip 52, when attached to the fourth section 50, has an outer diameter which is larger than the outer diameters of the second and third sections 46, 48. As shown, the second section 46 is formed as a hexagon. The fourth section 50 provides an attachment for engagement with a drive means (not shown), such an electric drill, and may also be formed as a hexagon.

The first section 44 includes a threaded portion 54 at its free end, an unthreaded concave portion 56 extending from an end of the threaded portion 54, and an enlarged shoulder portion 58 extending from the opposite end of the concave portion 56. The unthreaded section 46 extends from enlarged shoulder portion 58. The shoulder portion 58 has an outer diameter which is larger than the second and third sections 46, 48.

The nut 24 is a standard nut having a plurality of faces 60 that can be engaged by a tool and a central threaded passageway 62 which extends between opposite end faces. The nut 24 threadedly engages with the third section 48 of the arbor 22. The third section 48 of the arbor 22 is longer in length than the nut 24 and the nut 24 can travel along length of the third section 48.

Figure 4:
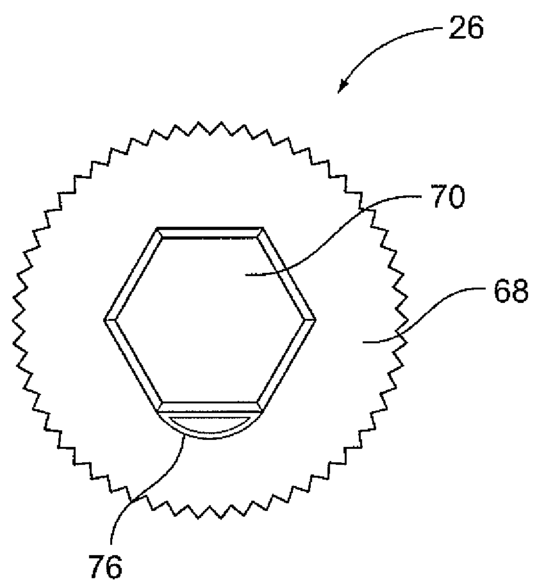
FIG. 4 is a top elevational view of a collar of the assembly showing an alternate embodiment.
Figure 5:
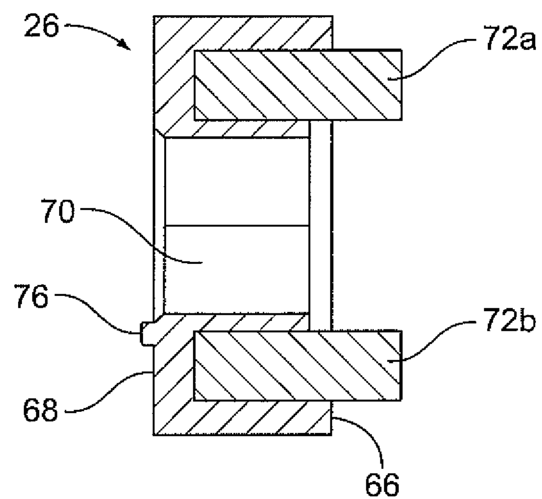
FIG. 5 is a cross-sectional view of the collar of FIG. 4.

The collar 26 is generally cylindrical and is formed from a wall 64, a first end face 66 at one end of the wall 64, and a second end face 68 at the other end of the wall 64. The wall 64 has a plurality of ridges on its outer surface to enable a user to easily grip the collar 26. A central passageway 70 extends through the collar 26 from the first end face 66 to the second end face 68. The central passageway 70 has the same shape as the second section 46 of the arbor 22—a hexagon as shown in the drawings. The shape of the central passageway 70 and the second section 46 can take other forms, provided the arbor 22 cannot rotate within the central passageway 70. The outer diameter of the central passageway 70 is smaller than the C-clip 52 so that the collar 26 cannot pass onto the fourth section 50 when mounted on the arbor 22, however, the collar 26 can move along the second and third sections 46, 48. The first end face 66 has a pair of diametrically opposed locking pins 72*a*, 72*b* extending therefrom. The locking pins 72*a*, 72*b* engage within one of the sets of apertures 38*a*, 38*b*, 40*a*, 40*b* in the back plate 30 of the hole saw 20 as described herein. The first end face 66 further has a counterbore 74 surrounding the passageway 70. The second end face 68 of the collar 26 has a protrusion 76 extending therefrom. The protrusion 76 may take a variety of forms, for example a crescent-shape (which is the preferred embodiment) as shown in FIGS. 4 and 5, a curved bump as shown in FIG. 1, and the like. The protrusion 76 is proximate to the central passageway 70.

To assemble the assembly 28, the C-clip 52 is initially disengaged from the groove in the fourth section 50. The fourth section 50 is inserted into the passageway 70 of the collar 26 and the collar 26 is moved past the groove. Thereafter, the fourth section 50 is inserted into the passageway 62 of the nut 24 and the nut 24 is threaded along the third section 48 until the end face of the nut 24 abuts against the end face 68 of the collar 26. The nut 24 remains threadedly attached to the third section 48 of the arbor 22. Next, the C-clip 52 is engaged with the fourth section 50 to prevent the removal of the nut 24 and collar 26 from the arbor 22.

The threaded portion 54 of the arbor 22 is threaded through the passageway 36 in the hole saw 20 until the back plate 30 abuts against the shoulder portion 58. As a result, the arbor 22 can be rotated relative to the hole saw 20. The hole saw 20 can be removed from the arbor 22 by the user unthreading the hole saw 20 from the arbor 22. The pilot bit is inserted into the passageway 42 of the arbor 22 and attached thereto by suitable means, such as a screw (not shown) that extends through a pilot hole (not shown) in the arbor 22.

The collar 26 is translated along the second section 46 until the locking pins 72*a*, 72*b* abut against the back plate 30. Thereafter, the collar 26 is gripped and rotated slightly to align the locking pins 72*a*, 72*b* with one of the sets of apertures 38*a*, 38*b*, 40*a*, 40*b* in the back plate 30. Once the locking pins 72*a*, 72*b* are aligned with the set of apertures, for example 38*a*, 38*b*, the collar 26 is translated along the second section 46 to move the locking pins 72*a*, 72*b* into the apertures 38*a*, 38*b* until the shoulder 58 seats within the counterbore 74 of the collar 26. The nut 24 is then tightened against the collar 26.

Figure 3:
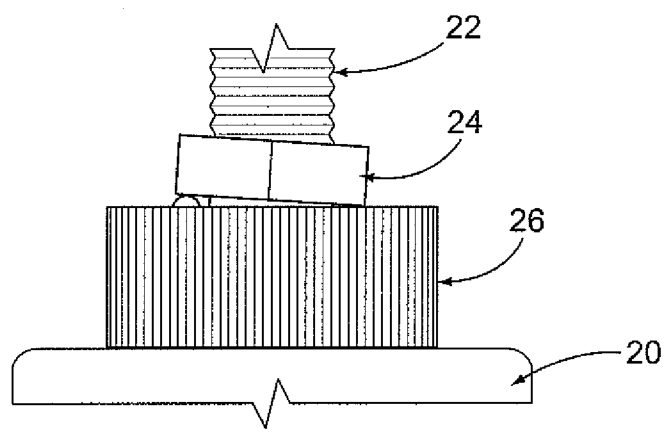
FIG. 3 is a side elevational view of the assembly.

As a result, the collar 26 is trapped between the back plate 30 and the nut 24, however, the nut 24 can be moved along the length of the third section 48, thereby allowing the collar 26 to move along the second and third sections 46, 48, which allows the locking pins 72, 72*b* of the collar 26 to completely disengage from the back plate 30. When the nut 24 abuts the collar 26, the nut 24 abuts against the protrusion 76 on the collar 26. The nut 24 is continued to be rotated against the protrusion 76 which causes the nut 24 to cock to one side as the nut 24 is tightened (shown exaggerated in FIG. 3), thereby causing sufficient friction to hold the nut 24 in place during aggressive use. Therefore, the nut 24 directly lies partly against the end face 68 and directly lies partly against the protrusion 76, and thus, the nut 24 is angled relative to the collar 26. Since the nut 24 is cocked relative to the collar 26, the nut 24 does not easily come loose on the arbor 22 even during aggressive use. The provision of the protrusion 76 overcomes the problem of prior art hole saws which may come loose often during use, even when tightened with a wrench.

The collar 26 is made using molded powder metal technology. During testing it has been found that the powdered metal protrusion 72 wore through and dusted away after approximately (100) cycles.

While a hexagon is shown for the second section 46 and for the passageway 70 of the collar 26, it is to be understood that other shapes can be used, provided that the second section 46 and the collar 26 cannot rotate relative to each other.

The crescent shape of the protrusion 72 provides a more attractive appearance than a raised bump, and the crescent-shaped protrusion 72 spreads the load out more over the assembly 28 as well.

While a preferred embodiment of the present invention is shown and described, it is envisioned that those skilled in the art may devise various modifications of the present invention without departing from the spirit and scope of the appended claims.

The invention claimed is:

1. An assembly comprising:

a hole saw comprising a back plate, a skirt depending from said back plate, and a cutting edge provided on said skirt, said back plate having a passageway therethrough and at least one aperture therethrough, said aperture is spaced from said passageway;

an arbor rotatably mounted to said hole saw, said arbor extending through said passageway;

a collar comprising a wall having first and second end faces and a passageway extending therethrough, and a protrusion extending from said second end face, said arbor extending through said passageway of said collar, said collar being nonrotatably mounted on said arbor and being slideable along said arbor, said collar includes at least one pin extending from said first end face which extends into said at least one aperture of said hole saw to prevent relative movement between said hole saw and said collar; and a nut rotatably mounted on said arbor, wherein said collar is trapped between said nut and said hole saw, and said nut directly bears against said protrusion of said collar, said protrusion causing said nut to cock relative to said collar.

2. The assembly as defined in claim 1, wherein said protrusion is a curved bump.

3. The assembly as defined in claim 2, wherein said collar and said protrusion are made of molded powder metal.

4. The assembly as defined in claim 1, wherein said protrusion is crescent-shaped.

5. The assembly as defined in claim 4, wherein said collar and said protrusion are made of molded powder metal.

6. An assembly comprising:

a hole saw, said hole saw comprising a back plate, a skirt depending from said back plate, and a cutting edge provided on said skirt, said back plate having a passageway therethrough;

an arbor rotatably mounted to said hole saw, said arbor extending through said passageway;

a collar non-rotatably mounted on said arbor, said collar comprising a wall having first and second end faces and a passageway extending therethrough, a protrusion extending from said second end face; and a nut rotatably mounted on said arbor, wherein said collar is trapped between said nut and said hole saw, and said nut directly bears against said protrusion of said collar, said protrusion causing said nut to cock relative to said collar said arbor includes a hexagonal section and said passageway of said collar is hexagonal, said passageway of said collar engaging with said hexagonal section of said arbor to prevent relative rotational movement between said collar and said arbor.

7. The assembly as defined in claim 1, wherein said collar and said protrusion are made of molded powder metal.

8. The assembly as defined in claim 1, wherein said passageway of said hole saw is threaded, and said arbor includes a threaded portion which threads into said passageway of said hole saw.

9. A method comprising:

providing a hole saw comprising a back plate, a skirt depending from said back plate, and a cutting edge provided on said skirt, said back plate having at least one aperture therethrough;

providing an arbor, a nut and a collar, said collar comprising a wall having first and second end faces, and a protrusion extending from said second end face, and at least one pin extending from said first end face;

mounting said arbor on said collar by sliding said collar on said arbor, said collar being non-rotatable relative to said arbor;

mounting said nut on said arbor by rotating said nut relative to said arbor;

mounting said arbor on said hole saw by rotating said arbor relative to said hole saw;

sliding said collar along said arbor until said at least one pin extends into said at least one aperture of said hole saw to prevent relative movement between said hole saw and said collar; and rotating said nut along said arbor until said nut bears against the protrusion on said collar such that said collar is trapped between said nut and said hole saw, said protrusion causing said nut to cock relative to said collar.

* * * * *

UNITED STATES PATENT AND TRADEMARK OFFICE

CERTIFICATE OF CORRECTION

PATENT NO. : 8,684,641 B2
APPLICATION NO. : 13/006633
DATED : April 1, 2014
INVENTOR(S) : Moffatt It is certified that error appears in the above-identified patent and that said Letters Patent is hereby corrected as shown below:

In the Specification

In Column 3, Line 55, delete “72, 72b” and insert -- 72a, 72b --, therefor.

In Column 4, Line 5, delete “protrusion 72” and insert -- protrusion 76 --, therefor.

In Column 4, Line 11, delete “protrusion 72” and insert -- protrusion 76 --, therefor.

In Column 4, Line 13, delete “protrusion 72” and insert -- protrusion 76 --, therefor.

Signed and Sealed this
Twenty-sixth Day of August, 2014

Michelle K. Lee

Michelle K. Lee
*Deputy Director of the United States Patent and Trademark Office*